(12) United States Patent
Kuri (10) Patent No.: US 9,250,129 B2
(45) Date of Patent: Feb. 2, 2016

(54) OPTICAL FILTER DEVICE

(75) Inventor: Ryohei Kuri, Suwa (JP)

(73) Assignee: Seiko Epson Corporation (JP)

( * ) Notice: Subject to any disclaimer, the term of this patent is extended or adjusted under 35 U.S.C. 154(b) by 118 days.

(21) Appl. No.: 13/478,231

(22) Filed: May 23, 2012

(65) Prior Publication Data

US 2012/0300303 A1 Nov. 29, 2012

(30) Foreign Application Priority Data

May 27, 2011 (JP) ................. 2011-118792

(51) Int. Cl.
*G01J 3/26* (2006.01)
*G01J 3/28* (2006.01)
*G02B 5/28* (2006.01)

(52) U.S. Cl.
CPC ............... *G01J 3/26* (2013.01); *G01J 3/2803* (2013.01); *G02B 5/28* (2013.01); *G02B 5/284* (2013.01)

(58) Field of Classification Search
CPC ............ G01J 9/0246; G01J 3/10; G01J 3/28; G01J 3/2803; G01J 3/0275; G01J 1/4257; G01J 2003/1213; G02B 5/284; G02B 26/001; G01N 21/29; H01S 5/0687
USPC ............... 359/337.2, 337.22, 341.41, 341.42, 359/578, 579, 583, 584, 589, 590, 238–240, 359/245, 247, 260, 261, 263, 196.1, 197.1, 359/199.1, 199.2, 199.3, 199.4, 200.6, 359/200.7, 200.8, 212.1, 223.1, 224.1, 359/224.2, 484.09, 489.19; 356/450, 454, 356/477–480, 900, FOR. 107, FOR. 114, 356/519; 385/31, 147; 324/71.1; 372/18, 372/32, 38.07
See application file for complete search history.

(56) References Cited

U.S. PATENT DOCUMENTS

| | | | | |
|---|---|---|---|---|
| 5,285,059 | A * | 2/1994 | Nakata et al. | 250/205 |
| 5,563,405 | A | 10/1996 | Woolaway, II et al. | |
| 5,748,302 | A | 5/1998 | Unno | |
| 6,320,663 | B1 * | 11/2001 | Ershov | 356/454 |
| 6,400,737 | B1 * | 6/2002 | Broutin et al. | 372/20 |
| 6,606,331 | B2 * | 8/2003 | Sousa | H01S 3/067 372/29.02 |
| 6,611,641 | B2 * | 8/2003 | Ghera et al. | 385/27 |
| 6,778,307 | B2 * | 8/2004 | Clark | 359/237 |
| 6,805,496 | B2 * | 10/2004 | Furuichi et al. | 385/93 |

(Continued)

FOREIGN PATENT DOCUMENTS

| | | |
|---|---|---|
| JP | 01-072015 | 3/1989 |
| JP | 01-072016 | 3/1989 |

(Continued)

*Primary Examiner* — Zachary Wilkes
*Assistant Examiner* — Collin X Beatty
(74) *Attorney, Agent, or Firm* — Harness, Dickey & Pierce, P.L.C.

(57) ABSTRACT

A tunable etalon, driver circuit, a light receiving device, an I-V convertor circuit connected to the light receiving device, an amplifier circuit having a gain switching function, an AD convertor, a microprocessor, and a voltage setting memory having a gain table as data of gain of the amplifier circuit are provided, and preliminary measurement of a light reception voltage is performed based on a current detected by the light receiving device, and the gain of the amplifier circuit is adjusted to adjust the light reception voltage obtained by the preliminary measurement to a dynamic range of the AD convertor with reference to the gain table of the gain of the amplifier circuit with respect to the light reception voltage obtained by the preliminary measurement stored in the voltage setting memory.

5 Claims, 9 Drawing Sheets

(56) References Cited

U.S. PATENT DOCUMENTS

| | | | |
|---|---|---|---|
| 6,833,913 B1 | 12/2004 | Wolf et al. | |
| 6,845,108 B1* | 1/2005 | Liu et al. | 372/20 |
| 6,859,284 B2* | 2/2005 | Rella et al. | 356/519 |
| 6,870,867 B2* | 3/2005 | Pontis | H01S 5/141 372/20 |
| 6,879,421 B2* | 4/2005 | Clark et al. | 359/237 |
| 7,012,683 B2 | 3/2006 | Wolf et al. | |
| 7,065,112 B2* | 6/2006 | Ghosh et al. | 372/32 |
| 7,103,239 B2* | 9/2006 | Kish et al. | 385/14 |
| 7,136,546 B2* | 11/2006 | Kish et al. | 385/14 |
| 7,286,125 B2 | 10/2007 | Morita | |
| 7,286,215 B2 | 10/2007 | Imura | |
| RE40,343 E* | 5/2008 | Anderson | 372/38.01 |
| 7,488,955 B2* | 2/2009 | Okada et al. | 250/458.1 |
| 2002/0005955 A1* | 1/2002 | Kramer et al. | 356/519 |
| 2002/0081065 A1* | 6/2002 | Asami | 385/31 |
| 2002/0186376 A1* | 12/2002 | Brown | 356/454 |
| 2003/0076083 A1* | 4/2003 | Kogan | 324/71.1 |
| 2003/0218759 A1* | 11/2003 | Lee et al. | 356/519 |
| 2004/0146077 A1* | 7/2004 | Kathman et al. | 372/32 |
| 2005/0018995 A1* | 1/2005 | Chang et al. | 385/147 |
| 2005/0083533 A1* | 4/2005 | Atia et al. | 356/454 |
| 2006/0215167 A1* | 9/2006 | O'Gorman et al. | 356/454 |
| 2008/0285601 A1* | 11/2008 | Sherrer et al. | 372/19 |
| 2009/0122817 A1* | 5/2009 | Sato et al. | 372/20 |
| 2011/0122906 A1* | 5/2011 | Seeley et al. | 372/38.07 |
| 2011/0194118 A1* | 8/2011 | Hirokubo et al. | 356/454 |
| 2011/0267625 A1* | 11/2011 | Guelachvili et al. | 356/454 |

FOREIGN PATENT DOCUMENTS

| | | |
|---|---|---|
| JP | 04-104020 | 4/1992 |
| JP | 05-063572 | 3/1993 |
| JP | 05-340816 | 12/1993 |
| JP | 08-009098 | 1/1996 |
| JP | 08-304283 | 11/1996 |
| JP | 09-229770 | 9/1997 |
| JP | 10-509295 | 9/1998 |
| JP | 11-142752 | 5/1999 |
| JP | 11-271220 | 10/1999 |
| JP | 2001-051202 | 2/2001 |
| JP | 2005-156242 | 6/2005 |
| JP | 2009-244498 A | 10/2009 |
| JP | 2009-282036 | 12/2009 |

* cited by examiner

| OUTPUT VOLTAGE OF AMPLIFIER CIRCUIT | GAIN OF AMPLIFIER CIRCUIT | |
|---|---|---|
| | MULTIPLEXER A | MULTIPLEXER B |
| $V_1 \sim V_2$ | 0  0  0 | 0  0  0 |
| $V_2 \sim V_3$ | 0  0  1 | 0  0  0 |
| $V_3 \sim V_4$ | 0  1  0 | 0  0  0 |
| $V_4 \sim V_5$ | 0  1  1 | 0  0  0 |
| $V_5 \sim V_6$ | 1  0  0 | 0  0  0 |
| $V_6 \sim V_7$ | 1  0  1 | 0  0  0 |
| $V_7 \sim V_8$ | 1  1  0 | 0  0  0 |
| $V_7 \sim V_8$ | 1  1  1 | 0  0  0 |
| $V_7 \sim V_8$ | 1  1  1 | 0  0  1 |
| ⋮ | ⋮ | ⋮ |

| OUTPUT VOLTAGE OF INTEGRATING CIRCUIT | INTEGRATION TIME | GAIN OF AMPLIFIER CIRCUIT | |
|---|---|---|---|
| | | MULTIPLEXER A | MULTIPLEXER B |
| $V_1 \sim V_2$ | $t_a$ | 0  0  0 | 0  0  0 |
| $V_2 \sim V_3$ | $t_b$ | 0  0  1 | 0  0  0 |
| $V_3 \sim V_4$ | $t_c$ | 0  1  0 | 0  0  0 |
| $V_4 \sim V_5$ | $t_d$ | 0  1  1 | 0  0  0 |
| $V_5 \sim V_6$ | $t_e$ | 1  0  0 | 0  0  0 |
| $V_6 \sim V_7$ | $t_f$ | 1  0  1 | 0  0  0 |
| $V_7 \sim V_8$ | $t_g$ | 1  1  0 | 0  0  0 |
| $V_7 \sim V_8$ | $t_h$ | 1  1  1 | 0  0  0 |
| $V_7 \sim V_8$ | $t_i$ | 1  1  1 | 0  0  1 |
| ⋮ | ⋮ | ⋮ | ⋮ |

OPTICAL FILTER DEVICE

BACKGROUND

1. Technical Field

The present invention relates to an optical filter device.

2. Related Art

In related art, there has been a transmission wavelength tunable interference filter (hereinafter, referred to as "tunable etalon") disclosed in Patent Document 1 (JP-A-11-142752). The tunable etalon varies the wavelength to transmit by adjusting a gap between mirrors using an external force on opposed substrates, for example, an electrostatic actuator. In the transmittance characteristics of the tunable etalon for wavelengths, in wavelength bands divided at fixed intervals, transmittance is determined at each interval. The wavelength interval is determined depending on the value of an electrostatic force (voltage) applied to the tunable etalon. Therefore, to obtain spectrum data of colors of objects, it is necessary to obtain data while changing the voltage applied to the tunable etalon sequentially with respect to each wavelength interval.

Figure 9:
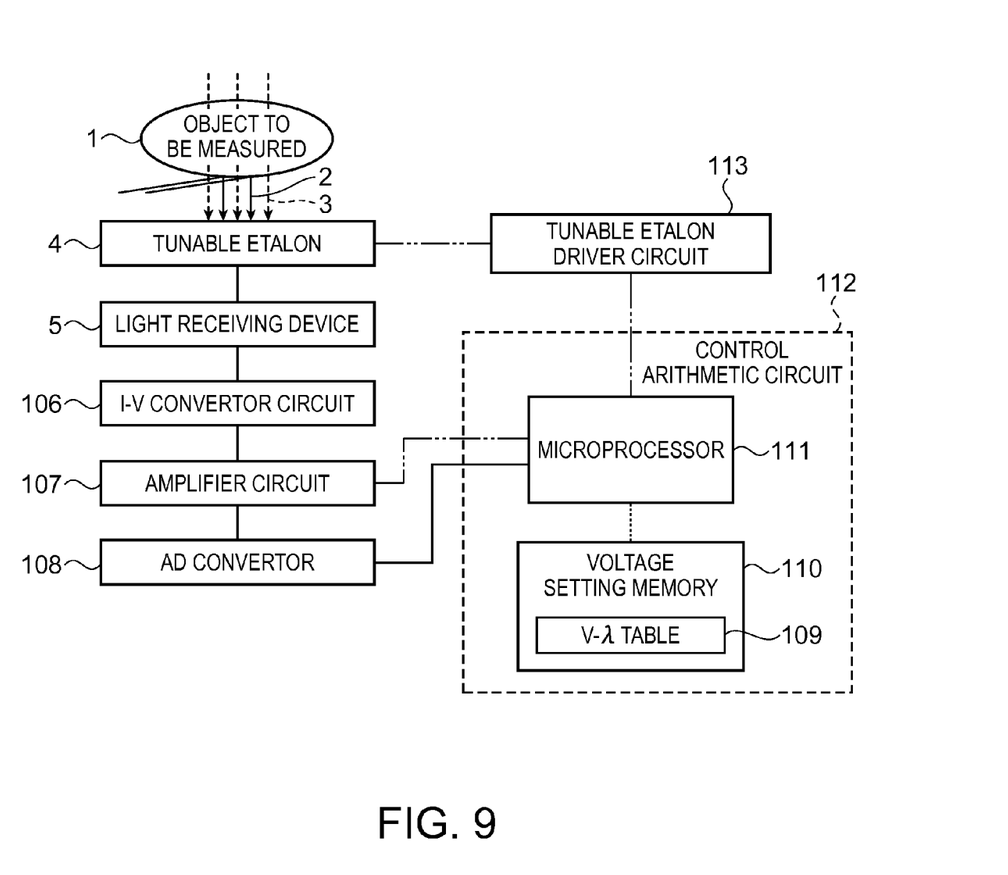
FIG. 9 is a block diagram showing a configuration of an optical filter device using a tunable etalon in related art.

FIG. 9 shows a block diagram of an optical filter device that measures a light reception voltage in a wavelength band using a tunable etalon in related art. In FIG. 9, a control arithmetic circuit 112 includes a microprocessor 111 and a voltage setting memory 110 that stores a V-λ table (voltage data table) 109. The level of the drive voltage of the tunable etalon is determined based on the voltage data of the V-λ table 109. The voltage setting memory 110 may be built in the microprocessor 111. The control arithmetic circuit 112 connects to a tunable etalon driver circuit 113, an amplifier circuit 107, and an AD converter 108.

A flow of measurement for one wavelength in an optical filter device in related art is as follows.

Measurement Procedures in Related Art

The tunable etalon driver circuit 113 outputs drive voltage data with respect to each wavelength to an electrostatic actuator of a tunable etalon 4 in response to the V-λ table 109 stored in the voltage setting memory 110 by a command from the control arithmetic circuit 112 (step 51).

A reflected light 2 or a transmitted light 3 from an object to be measured is transmitted through the tunable etalon 4 and enters a light receiving device 5 (step 52).

The light receiving device 5 is a current output device such as a photodiode, and the light is converted into a voltage (light reception voltage) in an I-V converter circuit 106 connected to the device (step 53).

The light reception voltage is amplified by the amplifier circuit 107 connected to the output of the I-V converter circuit (current-voltage converter circuit) 106 (step 54).

The amplified light reception voltage is converted from an analog signal into a digital signal by the AD converter 108 connected to the output of the amplifier circuit 107 (step 55).

The light reception voltage converted into the digital signal is measured by the microprocessor 111 (step 56).

In the case where the light reception voltage measured by the microprocessor 111 is larger than a reference voltage value, gain of the amplifier circuit 107 is lowered by a command from the control arithmetic circuit 112 so that the light reception voltage may be equal to or less than the reference voltage value, the measurement procedures step 52 to step 56 are repeatedly performed, and the measured light reception voltage value is updated (step 57).

However, there are two problems in light reception voltage measurement in the optical filter device using the tunable etalon in related art. The first problem is that the measurement time is longer. This is because the measurement procedures step 52 to step 56 are repeatedly performed until the voltage becomes equal to or less than the reference voltage value in the above described light reception voltage measurement. The second problem is that measurement accuracy becomes lower. This is because a system of raising the gain of the amplifier circuit when the measured light reception voltage is smaller is not incorporated, and, in the case where the voltage is significantly smaller than the dynamic range of the AD converter, the conversion error becomes larger at conversion from the analog signal into the digital signal.

SUMMARY

An advantage of some aspects of the invention is to solve at least a part of the problems described above, and the invention can be implemented as the following forms or application examples.

APPLICATION EXAMPLE 1

This application example is directed to an optical filter device including a transmission wavelength tunable interference filter that outputs a light having a specific wavelength, a tunable etalon driver circuit that drives the transmission wavelength tunable interference filter, a light receiving device that receives the light output from the transmission wavelength tunable interference filter, an I-V convertor circuit connected to the light receiving device, an amplifier circuit connected to the I-V convertor circuit and having a gain switching function, an AD convertor connected to the amplifier circuit, a microprocessor connected to the amplifier circuit and the AD convertor, and a voltage setting memory connected to the microprocessor and having a gain table as data of gain of the amplifier circuit, wherein preliminary measurement of a light reception voltage is performed based on a current detected by the light receiving device, and the gain of the amplifier circuit is adjusted to adjust the light reception voltage obtained by the preliminary measurement to a dynamic range of the AD convertor with reference to the gain table of the gain of the amplifier circuit with respect to the light reception voltage obtained by the preliminary measurement stored in the voltage setting memory.

According to the configuration, unlike the measurement in related art, without adjustment of the gain of the amplifier circuit by feeding back the light reception voltages measured at many times until the voltage becomes the reference voltage, the gain of the amplifier circuit may be determined for adjustment of the light reception voltage to the dynamic range of the AD converter with one preliminary measurement. Accordingly, there is an advantage that the measurement time may be made shorter than that in related art. Further, the conversion error at conversion from the analog signal into the digital signal may be made smaller because the light reception voltage obtained in the preliminary measurement is adjusted to the dynamic range of the AD converter.

APPLICATION EXAMPLE 2

In the optical filter device according to the application example, it is preferable that an integrating circuit connected to the amplifier circuit and the AD convertor is provided and a data table of integration times with respect to the light reception voltages obtained by the preliminary measurement is added to the voltage setting memory.

According to the configuration, the integrating circuit is added, and the measurement may be performed for a light source in which the amount of light changes with respect to time such as a monitor.

APPLICATION EXAMPLE 3

In the optical filter device according to the application example, it is preferable that the gain table sets a signal of a multiplexer and an integration time within the amplifier circuit respectively so that the gain of the amplifier circuit and the integration time may be reduced in response to increase with respect to each digit of an output voltage of the integrating circuit for adjustment of the output voltage of the integrating circuit to the dynamic range of the AD convertor.

According to the configuration, there is an advantage that the gain of the amplifier circuit and the integration time may be efficiently set.

APPLICATION EXAMPLE 4

In the optical filter device according to the application example, it is preferable that a feedback capacitor within the integrating circuit is discharged in synchronization with driving of the transmission wavelength tunable interference filter.

According to the configuration, there is an advantage that the measurement time may be made shorter by synchronizing driving of the transmission wavelength tunable interference filter and discharge of the feedback capacitor within the integrating circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be explained in detail. Note that the embodiments described as below do not unduly limit the invention described in the appended claims, and all of the configurations explained in the embodiments are not essential as solving means of the invention.

First Embodiment

Figure 1:
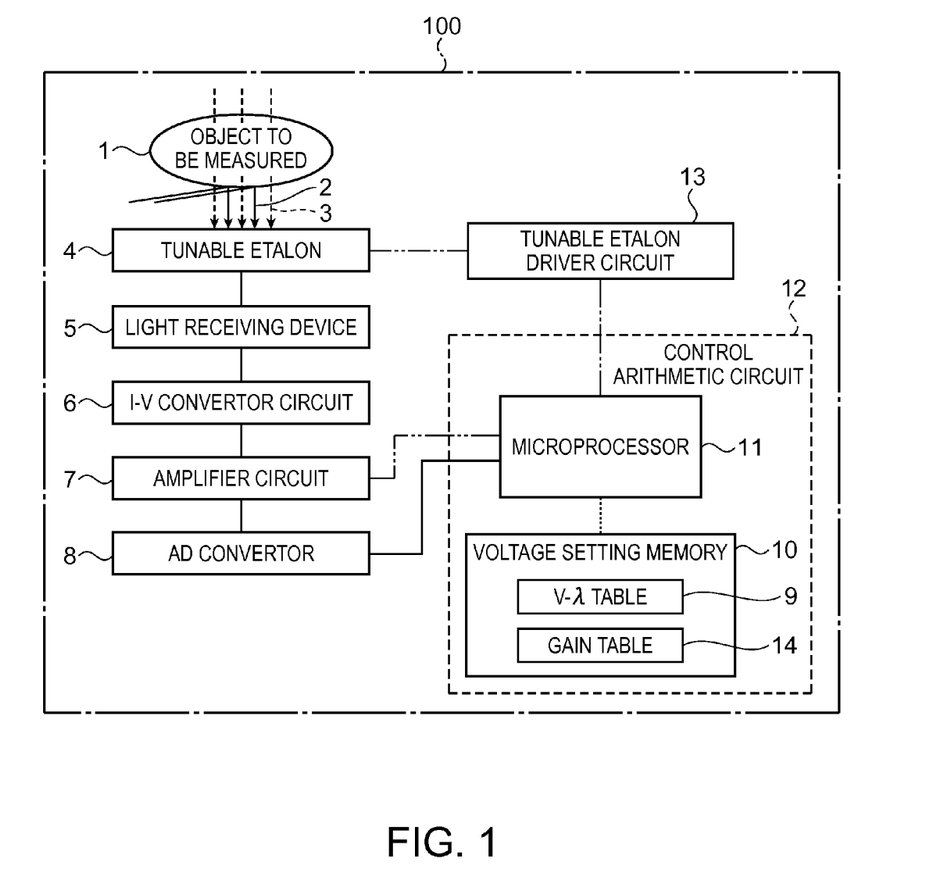
FIG. 1 is a block diagram showing a configuration of an optical filter device using a tunable etalon according to a first embodiment.
Figure 2:
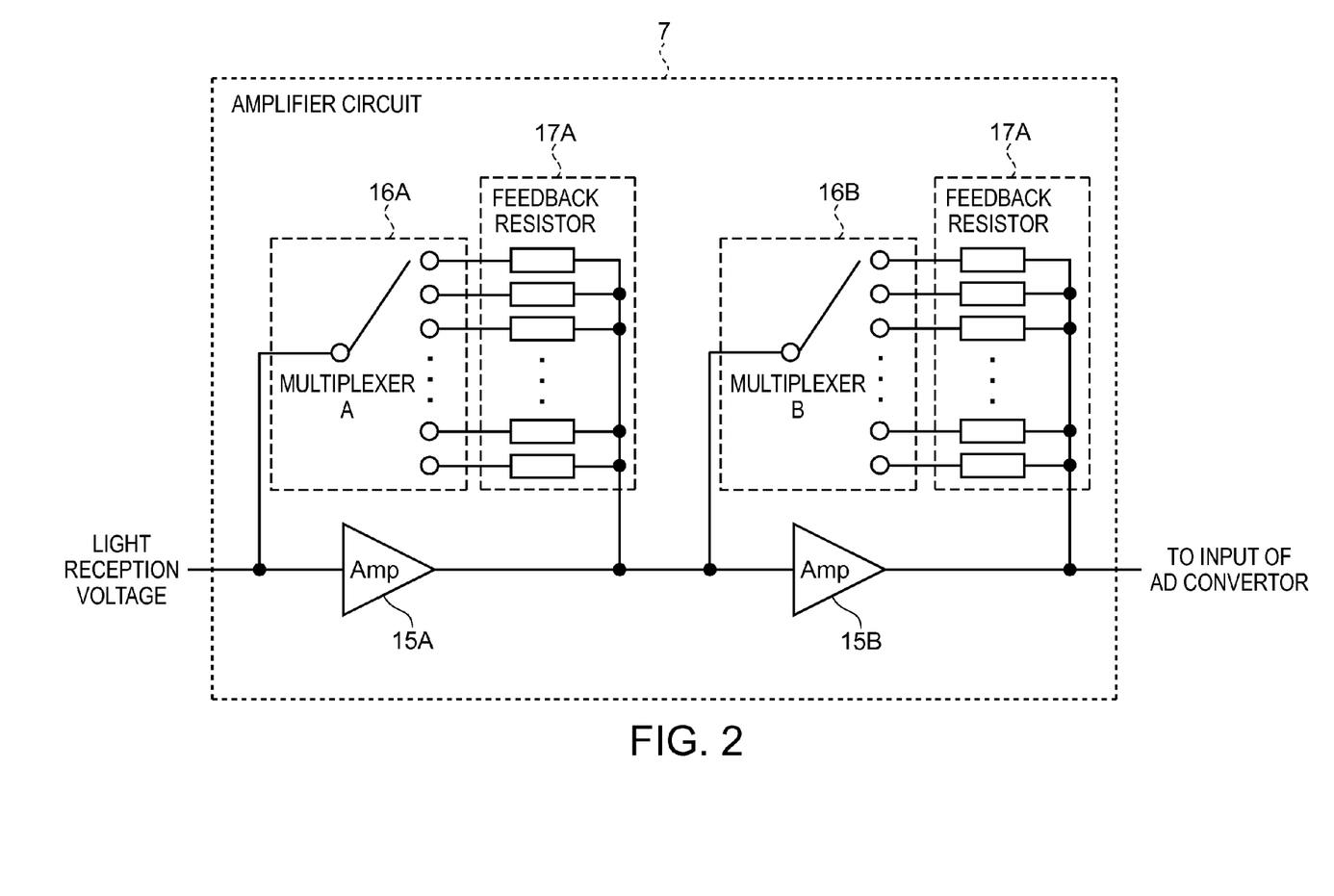
FIG. 2 shows a configuration of an amplifier circuit according to the first embodiment.
Figure 3:
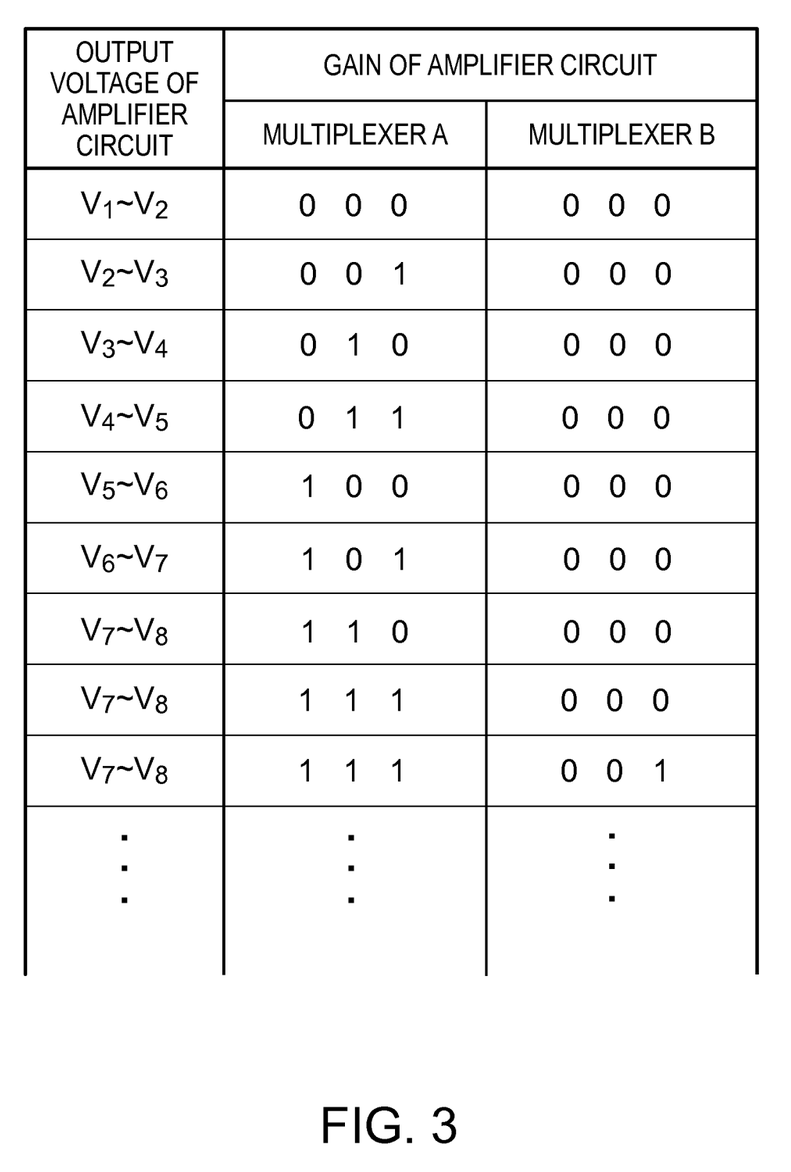
FIG. 3 shows a gain table in which signals of multiplexers within the amplifier circuit are set so that gain of the amplifier circuit may be reduced in response to increase with each digit of the output voltage of the amplifier circuit for adjustment of the output voltage of the amplifier circuit to the dynamic range of the AD converter according to the first embodiment.
Figure 4:
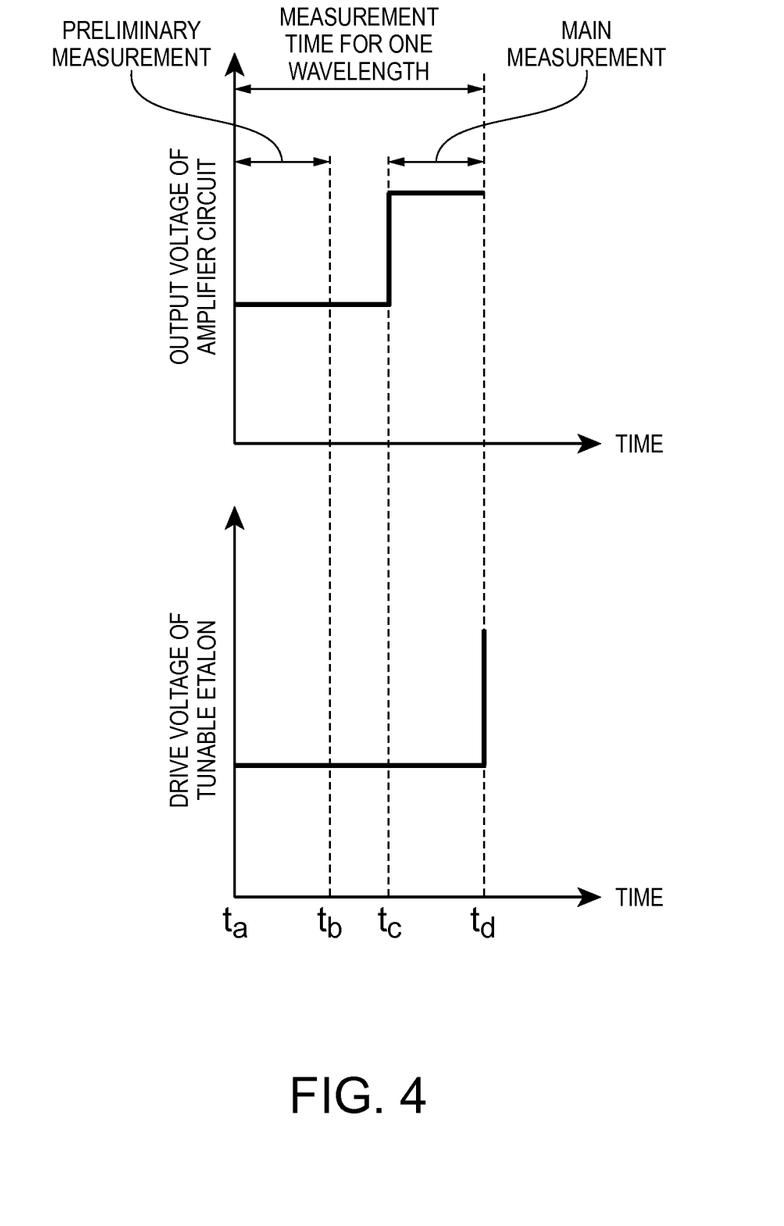
FIG. 4 is a diagram for explanation of an outline of the output voltage of the amplifier circuit at measurement for one wavelength and the waveform of the drive voltage of the etalon according to the first embodiment.

FIG. 1 is a block diagram showing a configuration of an optical filter device using a tunable etalon in the embodiment. FIG. 2 shows a configuration of an amplifier circuit. FIG. 3 shows a gain table in which signals of multiplexers within the amplifier circuit are set. FIG. 4 is a diagram for explanation of an outline of the output voltage of the amplifier circuit at measurement for one wavelength and the waveform of the drive voltage of the etalon.

As shown in FIG. 1, an optical filter device 100 includes a tunable etalon 4, a light receiving device 5, an I-V converter circuit 6, an amplifier circuit 7, an AD converter 8, a tunable etalon driver circuit 13, and a control arithmetic circuit 12.

The tunable etalon 4 varies the wavelength to transmit by adjusting a gap between substrates using an external force on the opposed substrates, for example, an electrostatic actuator.

The tunable etalon driver circuit 13 applies a voltage to the electrostatic actuator or the like of the tunable etalon 4 by a command of the control arithmetic circuit 12.

The light receiving device 5 is a current output device such as a photodiode and converts light entering from the tunable etalon 4 into a current signal.

The I-V converter circuit 6 converts the current output from the light receiving device 5 into a voltage (light reception voltage).

The amplifier circuit 7 amplifies the voltage output from the I-V converter circuit 6 and adjusts and switches gain by a command of the control arithmetic circuit 12.

The AD converter 8 converts the voltage signal (analog signal) output from the amplifier circuit 7 into a digital signal.

The control arithmetic circuit 12 takes in the voltage that has been converted into the digital signal output from the AD converter 8. Further, the control arithmetic circuit 12 performs gain change of the amplifier circuit 7 and setting of the output voltage of the tunable etalon driver circuit 13.

In FIG. 1, the control arithmetic circuit 12 includes a microprocessor 11, and a voltage setting memory 10 that stores a gain table 14 and a V-λ table 9.

The microprocessor 11 includes a microcomputer, a gate array, etc.

The V-λ table 9 stores data of transmission wavelengths (λ) in response to distances of the gap of the tunable etalon with respect to the drive voltages (V) of the tunable etalon 4, and the level of the drive voltage of the tunable etalon is determined based on the voltage data.

The gain table 14 is data in which relationships between the output voltages of the amplifier circuit 7 and the signals of multiplexers 16A, 16B within the amplifier circuit 7 are set.

The voltage setting memory 10 is a memory device such as a flash memory, and may be built in the microprocessor 11.

The amplifier circuit 7 shown in FIG. 2 includes amplifiers 15A, 15B, the multiplexers 16A, 16B, and feedback resistors 17A, and may change gain by changing the feedback resistors 17A using the multiplexers 16A, 16B. The amplifiers 15A, 15B amplify the voltage output from the I-V converter circuit 6 and include signal amplifying elements such as operational amplifiers. The multiplexers 16A, 16B are switching elements that select one output from plural outputs from one input, and connected to the feedback parts of the amplifiers 15A, 15B.

The gain table 14 shown in FIG. 3 is table data in which signals of the multiplexers 16A, 16B within the amplifier circuit 7 are set so that gain of the amplifier circuit 7 may be reduced in response to increase with each digit of the output voltage of the amplifier circuit 7 for adjustment of the output voltage of the amplifier circuit 7 to the dynamic range of the AD converter 8. The control arithmetic circuit 12 connects to the tunable etalon driver circuit 13, the amplifier circuit 7, and the AD converter 8.

Next, a flow of measurement for one wavelength in the optical filter device of the embodiment is shown as below.
Measurement Procedures First, the tunable etalon driver circuit 13 outputs a drive voltage applied to an electrostatic actuator with respect to each wavelength in response to the v-λ table 9 stored in the voltage setting memory 10 by a command from the control arithmetic circuit 12 (step 1).

A reflected light 2 or a transmitted light 3 from an object to be measured 1 is transmitted through the tunable etalon 4 and enters the light receiving device 5 (step 2).

The light receiving device 5 is a current output device such as a photodiode and the light is converted into a voltage (light reception voltage) in the I-V converter circuit 6 connected to the device (step 3).

The light reception voltage is amplified by the amplifier circuit 7 connected to the output of the I-V converter circuit 6 (step 4).

The amplified light reception voltage is converted from an analog signal into a digital signal by the AD converter 8 connected to the output of the amplifier circuit 7 (step 5). The step 1 to step 5 correspond to time $t_a$ to $t_b$ in FIG. 4.

The light reception voltage converted into the digital signal is preliminarily measured by the microprocessor 11 (step 6). The step 6 corresponds to time $t_b$ in FIG. 4.

To adjust the preliminarily measured light reception voltage to the dynamic range of the AD converter 8, gain of the amplifier circuit 7 is changed in response to the gain table 14 (see FIG. 3) stored in the voltage setting memory 10 by a command from the control arithmetic circuit 12 (step 7). The step 7 corresponds to time $t_b$ to $t_c$ in FIG. 4.

Main measurement is started (step 8). The step 8 corresponds to time $t_c$ in FIG. 4.

The light reception voltage is amplified by the amplifier circuit 7 connected to the output of the I-V converter circuit 6 (step 9).

The amplified light reception voltage is converted from an analog signal into a digital signal by the AD converter 8 connected to the output of the amplifier circuit 7 (step 10). The steps 9, 10 correspond to time $t_c$ to $t_d$ in FIG. 4.

The light reception voltage converted into the digital signal is mainly measured by the microprocessor 11 (step 11). The step 11 corresponds to time $t_d$ in FIG. 4.

Figure 5:
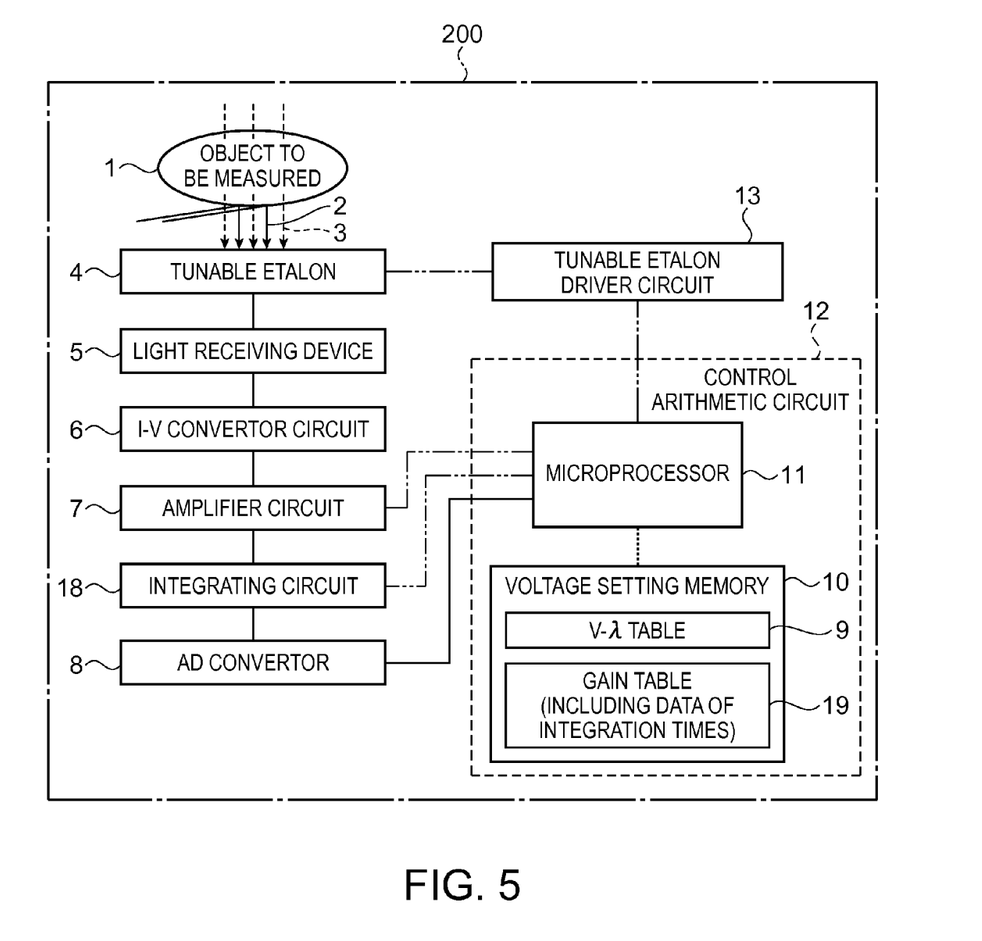
FIG. 5 is a block diagram showing a configuration of an optical filter device using a tunable etalon according to a second embodiment.
Figure 6:
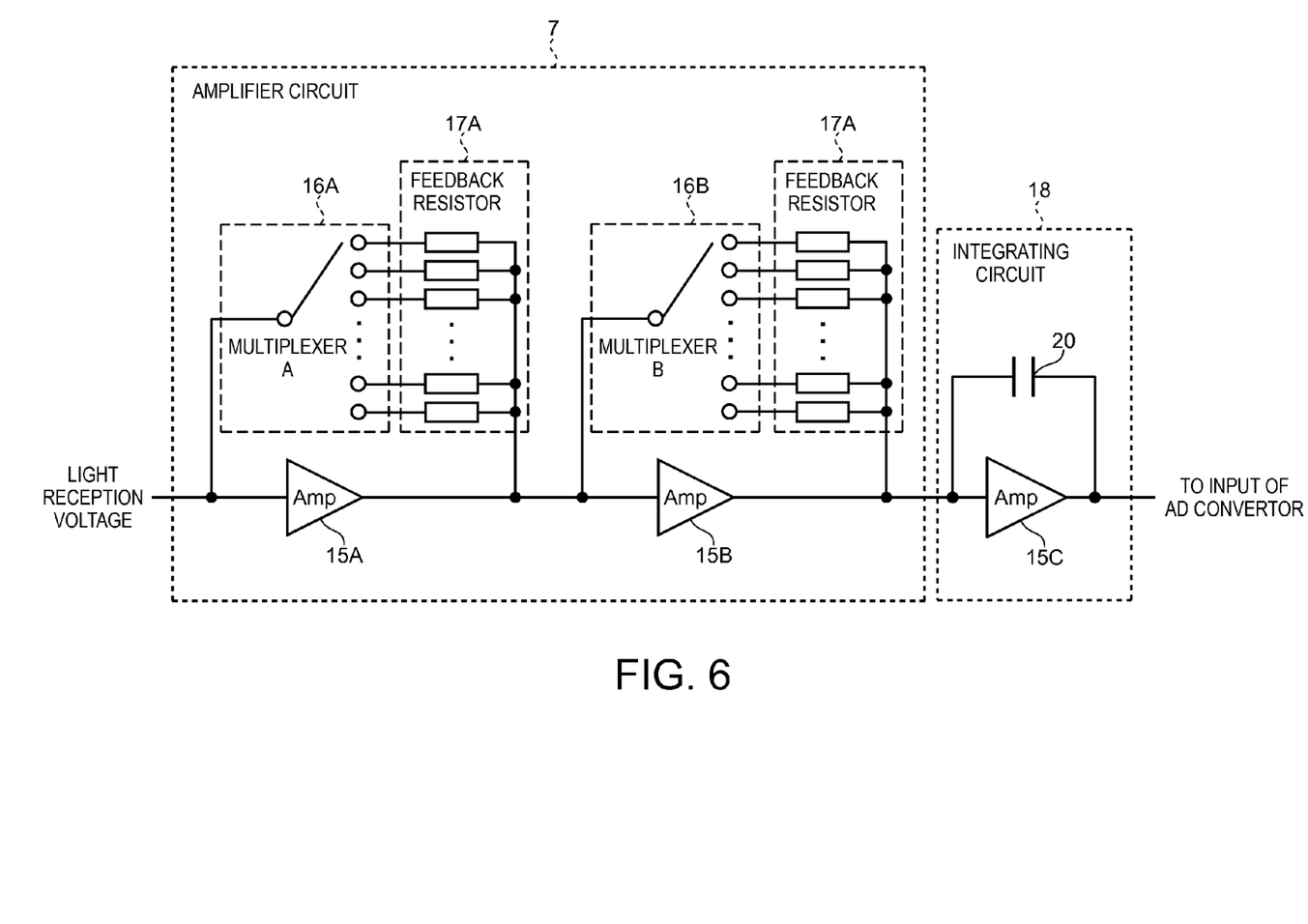
FIG. 6 shows configurations of an amplifier circuit and an integrating circuit according to the second embodiment.
Figure 7:
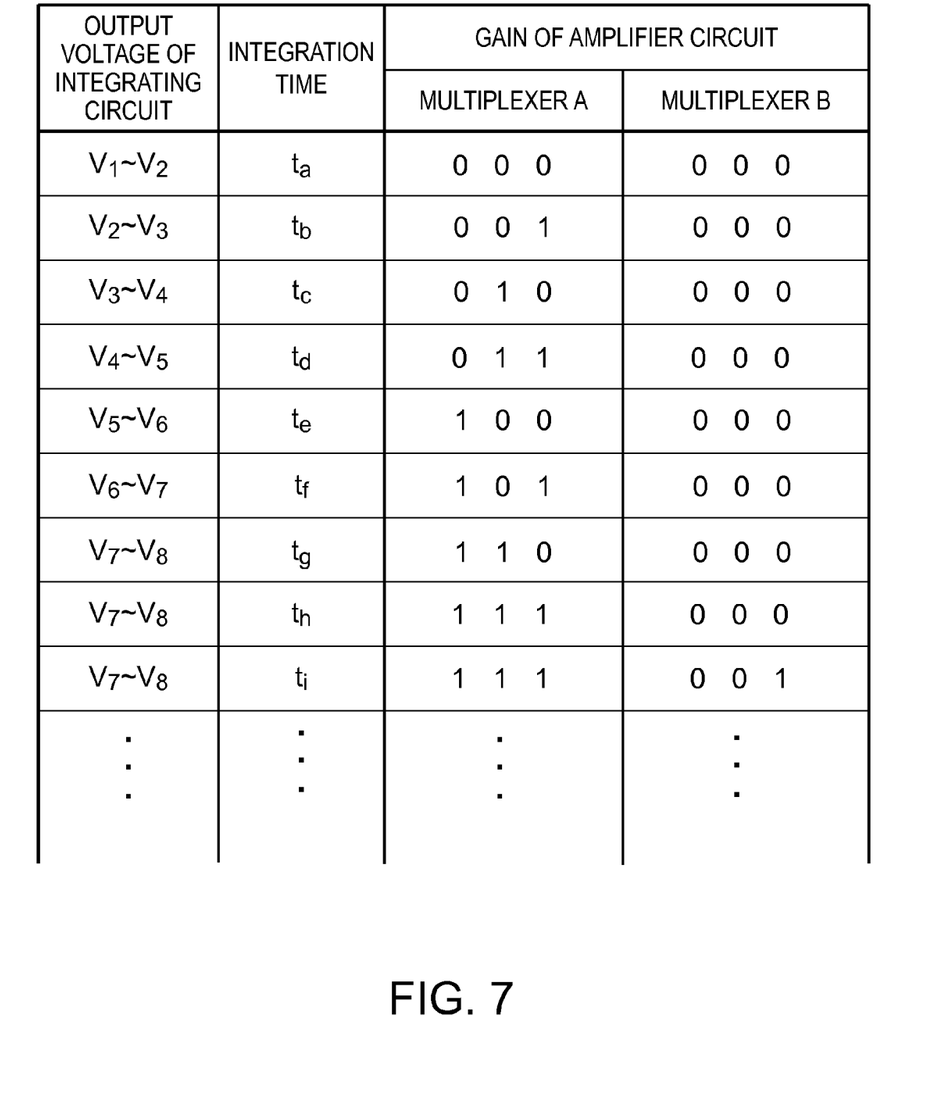
FIG. 7 shows a gain table in which signals of multiplexers within the amplifier circuit and integration times are respectively set so that gain of the amplifier circuit and the integration time may be reduced in response to increase with each digit of the output voltage of the integrating circuit for adjustment of the output voltage of the integrating circuit to the dynamic range of the AD converter according to the second embodiment.
Figure 8:
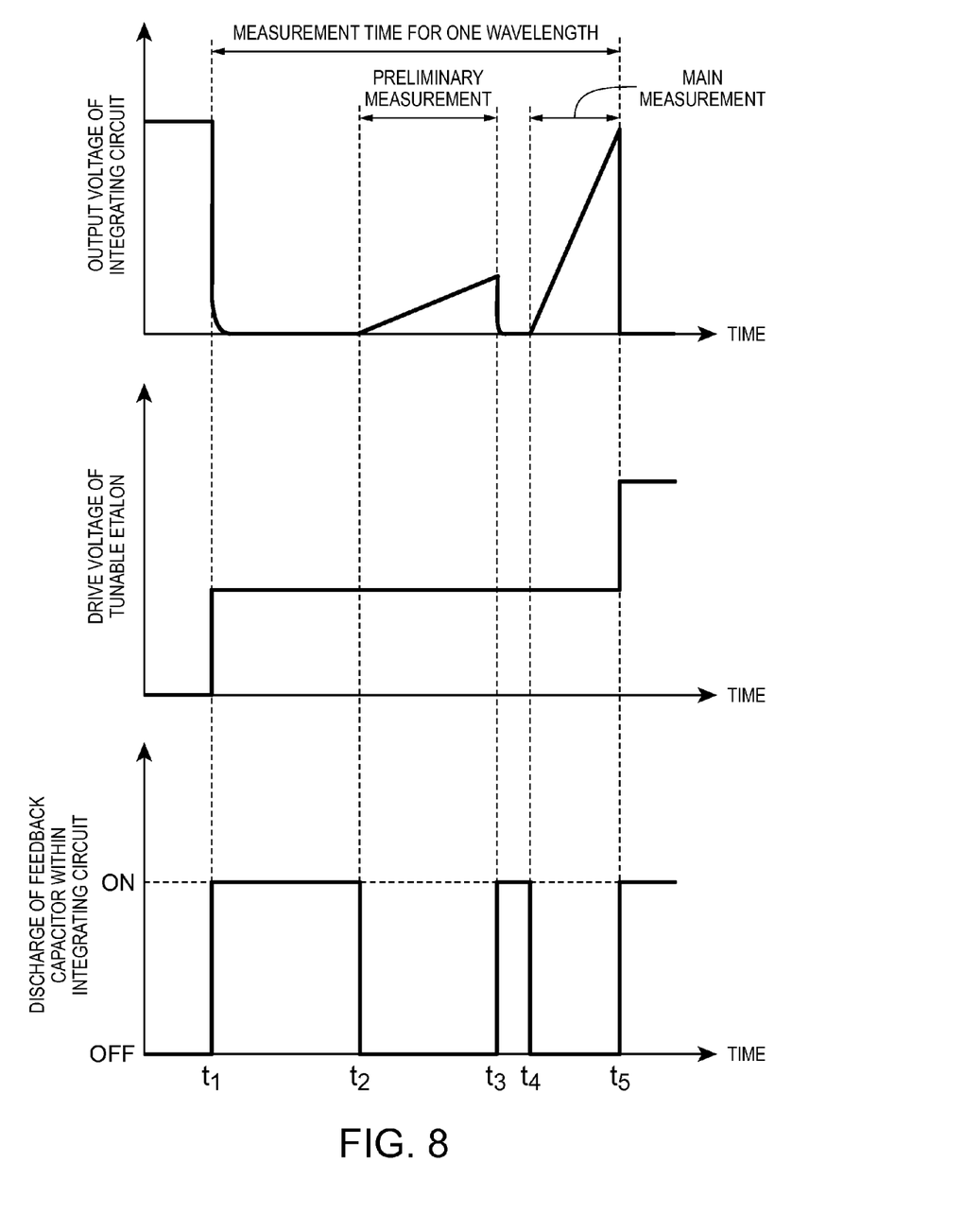
FIG. 8 is a diagram for explanation of an outline of the output voltage of the integrating circuit at measurement for one wavelength, the drive voltage of the etalon, and the waveform of discharge of a feedback capacitor within the integrating circuit according to the second embodiment.

As described above, compared to the spectrum measurement in the optical filter device in related art, without adjustment of the gain of the amplifier circuit by feeding back the measurement voltage at many times until the voltage becomes the reference voltage, the gain of the amplifier circuit 7 may be determined for adjustment of the light reception voltage to the dynamic range of the AD converter with one preliminary measurement. Accordingly, the measurement time may be made shorter than that in related art, and the conversion error at conversion from the analog signal into the digital signal may be made smaller because the light reception voltage obtained in the preliminary measurement is adjusted to the dynamic range of the AD converter 8.
Second Embodiment FIG. 5 is a block diagram showing a configuration of an optical filter device using a tunable etalon in the embodiment. FIG. 6 shows configurations of an amplifier circuit and an integrating circuit. FIG. 7 shows a gain table in which signals of multiplexers within the amplifier circuit and integration times in the integrating circuit are set. FIG. 8 is a diagram for explanation of an outline of the output voltage of the integrating circuit at measurement for one wavelength, the drive voltage of the etalon, and the waveform of discharge of a feedback capacitor.

As shown in FIG. 5, an optical filter device 200 includes a tunable etalon 4, a light receiving device 5, an I-V converter circuit 6, an amplifier circuit 7, an integrating circuit 18, an AD converter 8, a tunable etalon driver circuit 13, and a control arithmetic circuit 12.

The tunable etalon 4 varies the wavelength to transmit by adjusting a gap between substrates using an external force on the opposed substrates, for example, an electrostatic actuator.

The tunable etalon driver circuit 13 applies a voltage to the electrostatic actuator or the like of the tunable etalon 4 by a command of the control arithmetic circuit 12.

The light receiving device 5 is a current output device such as a photodiode and converts light entering from the tunable etalon 4 into a current signal.

The I-V converter circuit 6 converts the current output from the light receiving device 5 into a voltage (light reception voltage).

The amplifier circuit 7 amplifies the voltage output from the I-V converter circuit 6 and adjusts and switches gain by a command of the control arithmetic circuit 12.

The integrating circuit 18 is a circuit that integrates the voltage output from the amplifier circuit 7 with respect to time and sets an integration time by the control arithmetic circuit 12.

The AD converter 8 converts the voltage signal (analog signal) output from the integrating circuit 18 into a digital signal.

The control arithmetic circuit 12 takes in the voltage that has been converted into the digital signal output from the AD converter 8. Further, the control arithmetic circuit 12 performs gain change of the amplifier circuit 7 and setting of the output voltage of the tunable etalon driver circuit 13.

In FIG. 5, the control arithmetic circuit 12 includes a microprocessor 11, and a voltage setting memory 10 that stores a gain table 19 and a V-λ table 9.

The microprocessor 11 includes a microcomputer, a gate array, etc.

The V-λ table 9 stores data of transmission wavelengths (λ) in response to distances of the gap of the tunable etalon 4 for the drive voltages (V) of the tunable etalon 4, and the level of the drive voltage of the tunable etalon is determined based on the voltage data.

The gain table 19 is data in which relationships between the output voltages of the amplifier circuit 7 and the signals of multiplexers 16A, 16B within the amplifier circuit 7 are set.

The voltage setting memory 10 is a memory device such as a flash memory, and may be built in the microprocessor 11.

The amplifier circuit 7 shown in FIG. 6 includes amplifiers 15A, 15B, the multiplexers 16A, 16B, and feedback resistors 17A, and may change gain by changing the feedback resistors 17A using the multiplexers 16A, 16B. Further, the integrating circuit 18 shown in FIG. 6 includes an amplifier 15C and a feedback capacitor 20, and discharge of the feedback capacitor is performed by turning on and off of a switching element such as an analog switch or a photocoupler connected to the feedback capacitor 20 in parallel by a command of the control arithmetic circuit 12. The amplifiers 15A, 15B amplify the voltage output from the I-V converter circuit 6 and include signal amplifying elements such as operational amplifiers. The multiplexers 16A, 16B are switching elements that select one output from plural outputs from one input, and connected to the feedback parts of the amplifiers 15A, 15B.

The gain table 19 shown in FIG. 7 is table data in which signals of the multiplexers 16A, 16B within the amplifier circuit 7 are set so that gain of the amplifier circuit 7 may be reduced in response to increase with each digit of the output voltage of the integrating circuit 18 for adjustment of the output voltage of the integrating circuit 18 to the dynamic range of the AD converter 8. The control arithmetic circuit 12 connects to the tunable etalon driver circuit 13, the amplifier circuit 7, the integrating circuit 18, and the AD converter 8.

Next, a flow of measurement for one wavelength in the optical filter device of the embodiment is shown as below.

Measurement Procedures

The tunable etalon driver circuit 13 outputs a drive voltage applied to an electrostatic actuator with respect to each wavelength in response to the V-λ table 9 stored in the voltage setting memory 10 by a command from the control arithmetic circuit 12 (step 21).

The feedback capacitor 20 within the integrating circuit continues to discharge until driving of tunable etalon is completed by a command from the control arithmetic circuit 12 and the output voltage of the integrating circuit 18 is set to 0 V (step 22). The step 22 corresponds to time $t_1$ to $t_2$ in FIG. 8.

A reflected light 2 or a transmitted light 3 from an object to be measured 1 is transmitted through the tunable etalon 4 and enters the light receiving device 5 (step 23).

The light receiving device 5 is a current output device such as a photodiode and the light is converted into a voltage (light reception voltage) in the I-V converter circuit 6 connected to the device (step 24).

The light reception voltage is amplified by the amplifier circuit 7 connected to the output of the I-V converter circuit 6 (step 25).

The amplified light reception voltage is integrated by the time commanded from the control arithmetic circuit 12 by the integrating circuit 18 connected to the output of the amplifier circuit 7 (step 26).

The integrated light reception voltage is converted from an analog signal into a digital signal by the AD converter 8 connected to the output of the integrating circuit 18 (step 27). The steps 23 to 27 correspond to time $t_2$ to $t_3$ in FIG. 8.

The light reception voltage converted into the digital signal is preliminarily measured by the microprocessor 11 (step 28). The step 28 corresponds to time $t_3$ in FIG. 8.

Gain of the amplifier circuit 7 and the integration time are changed in response to the gain table 19 (see FIG. 7) stored in the voltage setting memory 10 by a command from the control arithmetic circuit 12 (step 29).

The feedback capacitor 20 within the integrating circuit continues to discharge until changes of the gain of the amplifier circuit 7 and the integration time are completed by a command from the control arithmetic circuit 12 and sets the output voltage of the integrating circuit 18 to 0 V (step 30) for the next light reception voltage measurement. The steps 29, 30 correspond to time $t_3$ to $t_4$ in FIG. 8.

Main measurement is started (step 31).

The light reception voltage is amplified by the amplifier circuit 7 connected to the output of the I-V converter circuit 6 (step 32).

The amplified light reception voltage is integrated by the time commanded from the control arithmetic circuit 12 by the integrating circuit 18 connected to the output of the amplifier circuit 7 (step 33).

The integrated light reception voltage is converted from an analog signal into a digital signal by the AD converter 8 connected to the output of the integrating circuit 18 (step 34). The steps 31 to 34 correspond to time $t_4$ to $t_5$ in FIG. 8.

The light reception voltage converted into the digital signal is mainly measured by the microprocessor 11 (step 34). The step 35 corresponds to time $t_5$ in FIG. 8.

As described above, compared to the spectrum measurement in the optical filter device in related art, without adjustment of the gain of the amplifier circuit by feeding back the measurement voltage at many times until the voltage becomes the reference voltage, the gain of the amplifier circuit 7 may be determined for adjustment of the light reception voltage to the dynamic range of the AD converter with one preliminary measurement. Accordingly, the measurement time may be made shorter than that in related art, and the conversion error at conversion from the analog signal into the digital signal may be made smaller because the light reception voltage obtained in the preliminary measurement is adjusted to the dynamic range of the AD converter 8.

Further, the integrating circuit 18 is added, and the measurement may be performed for a light source in which the amount of light changes with respect to time such as a monitor.

The entire disclosure of Japanese Patent Application No. 2011-118792, filed May 27, 2011 is expressly incorporated by reference herein.

What is claimed is:

1. An optical filter device comprising:
   a transmission wavelength tunable interference filter that outputs a light having a specific wavelength, wherein a given wavelength of a light outputted by the transmission wavelength tunable interference filter is based on a gap between mirrors disposed on substrates opposite to each other and controlled by an electrostatic actuator;
   a tunable etalon driver circuit that drives the transmission wavelength tunable interference filter to change the gap between the mirrors;
   a light receiving device that receives the light output from the transmission wavelength tunable interference filter and outputs a current;
   an I-V convertor circuit connected to the light receiving device and converts the current to a voltage;
   an amplifier circuit connected to the I-V convertor circuit and having a gain switching function, wherein the amplifier circuit includes a multiplexer, and the amplifier circuit amplifies the voltage provided by the I-V converter circuit;
   an AD convertor connected to the amplifier circuit and converts the voltage amplified by the amplifier circuit to a digital signal;
   a microprocessor connected to the amplifier circuit and the AD convertor, the microprocessor receives the digital signal from the AD convertor and controls the gain switching function of the amplifier circuit; and
   a voltage setting memory connected to the microprocessor and stores a gain table, the gain table defines corresponding relationships between an output voltage of the amplifier circuit and a signal of the multiplexer disposed within the amplifier circuit, wherein
   the microprocessor performs a preliminary measurement of a light reception voltage based on the current detected by the light receiving device, the microprocessor adjusts the gain of the amplifier circuit based on the gain table after every occurrence in which the tunable etalon driver circuit changes the gap between the mirrors, such that the light reception voltage obtained by the preliminary measurement is adjusted to a dynamic range of the AD convertor, the multiplexer of the amplifier circuit selects a given output from a plurality of outputs to control the gain of the amplifier circuit, and the microprocessor controls the multiplexer based on the gain table to adjust the gain of the amplifier circuit such that the light reception voltage obtained by the preliminary measurement is adjusted to the dynamic range of the AD convertor.

2. The optical filter device according to claim 1, further comprising an integrating circuit connected to the amplifier circuit and the AD convertor, wherein a data table of integration times with respect to the light reception voltages obtained by the preliminary measurement is added to the voltage setting memory.

3. The optical filter device according to claim 2, wherein the gain table respectively sets the signal of the multiplexer within the amplifier circuit and an integration time so that the gain of the amplifier circuit and the integration time may be reduced in response to increase with respect to each digit of an output voltage of the integrating circuit for adjustment of the output voltage of the integrating circuit to the dynamic range of the AD convertor.

4. The optical filter device according to claim 2, wherein a feedback capacitor within the integrating circuit is discharged in synchronization with driving of the transmission wavelength tunable interference filter.

5. The optical filter device of claim 1 wherein a time period in which the preliminary measurement is measured overlaps with a time period in which the tunable etalon driver circuit drives the transmission wavelength tunable interference filter such that the transmission wavelength tunable interference filter outputs the light having the specific wavelength.

* * * * *